United States Patent [19]
Raimbault

[11] 3,955,895

[45] May 11, 1976

[54] RAIL EXPANSION JOINT

[75] Inventor: Roger Raimbault, Ermont, France

[73] Assignee: Societe dite Aeropar Societe Anonyme Francaise, Paris, France; a part interest

[22] Filed: July 25, 1974

[21] Appl. No.: 491,933

[30] Foreign Application Priority Data
July 27, 1973 France .............................. 73.27541

[52] U.S. Cl. ............................... 403/340; 403/364; 403/388
[51] Int. Cl.² ...................... F16B 7/00; F16D 1/00; F16L 23/00
[58] Field of Search .......... 403/340, 341, 364, 388, 403/28, 393; 52/573, 592, 593, 753 T, 726

[56] References Cited
UNITED STATES PATENTS
1,896,964   2/1933   Lind .................................. 403/341
3,623,261   11/1971   Freese ......................... 52/753 T X Primary Examiner—Werner H. Schroeder
Assistant Examiner—Wayne L. Shedd
Attorney, Agent, or Firm—Browdy and Neimark

[57] ABSTRACT

A rail expansion joint made of two slidably engaging parts, each part being identical in shape and having a full thickness portion welded to the rail and a half thickness portion adapted to overlap the corresponding portion of the other part, the free ends of these two portions having a saw-tooth profile engaging the corresponding teeth of the two portions of the other part.

4 Claims, 6 Drawing Figures

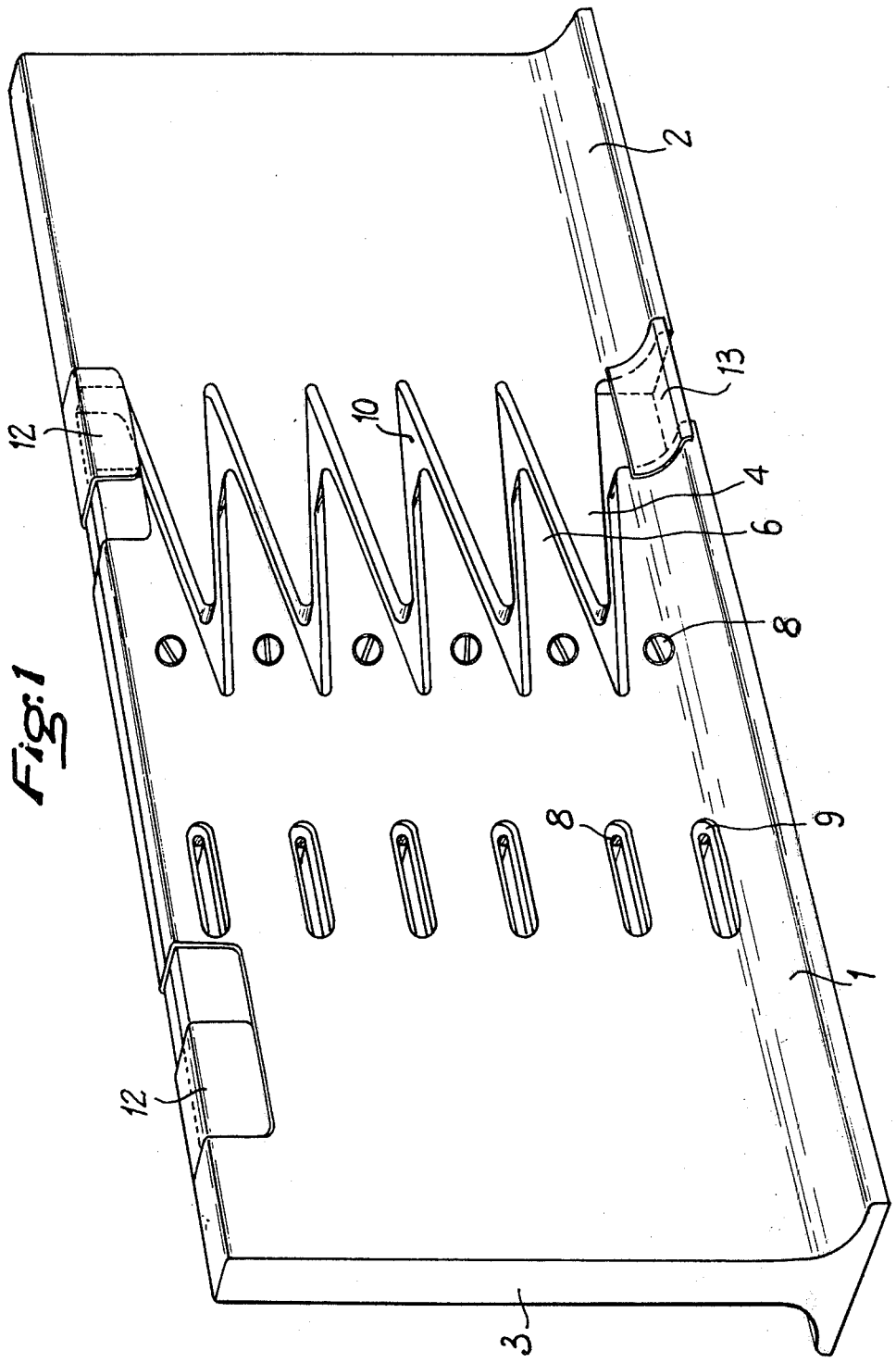

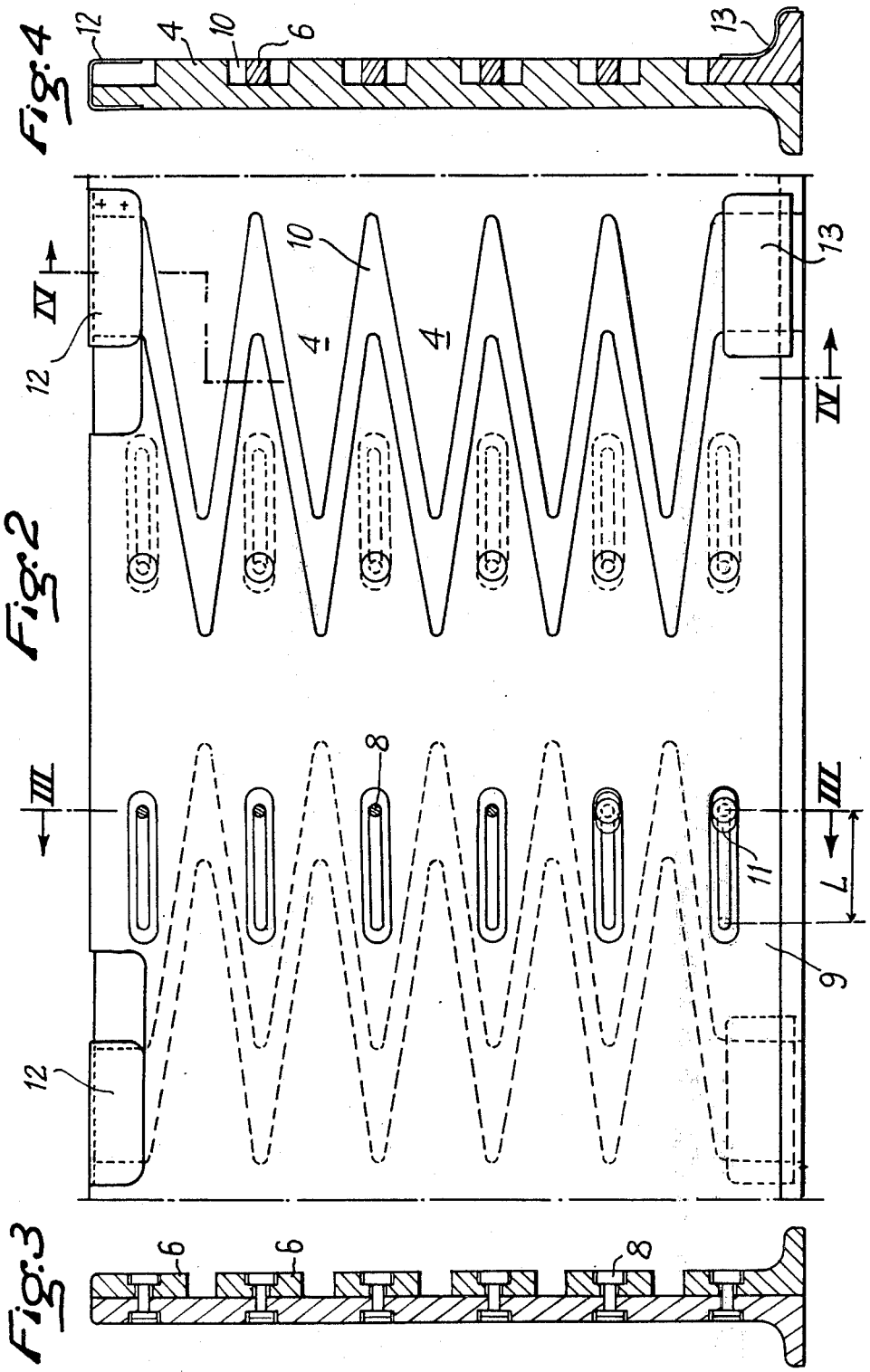

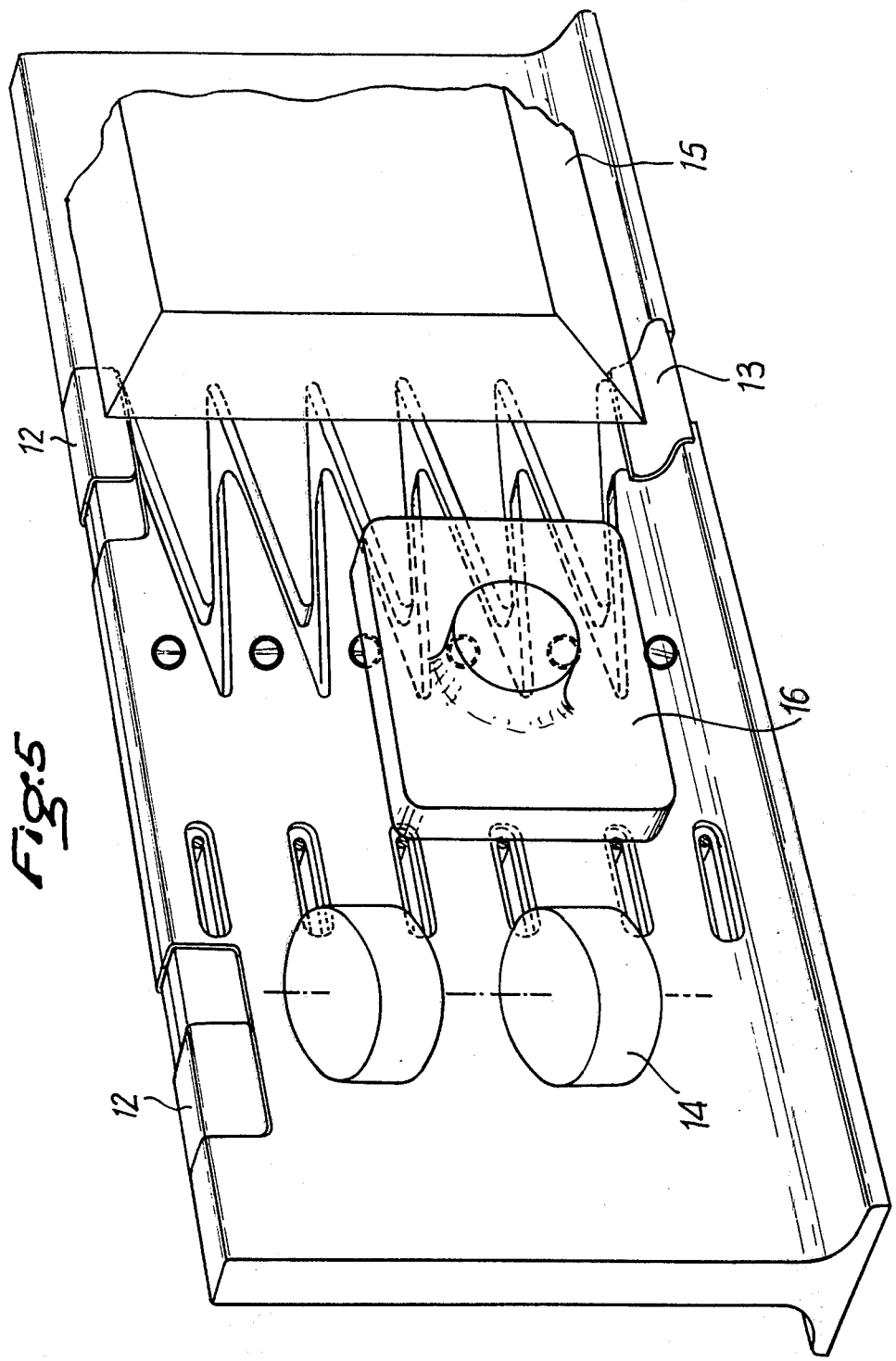

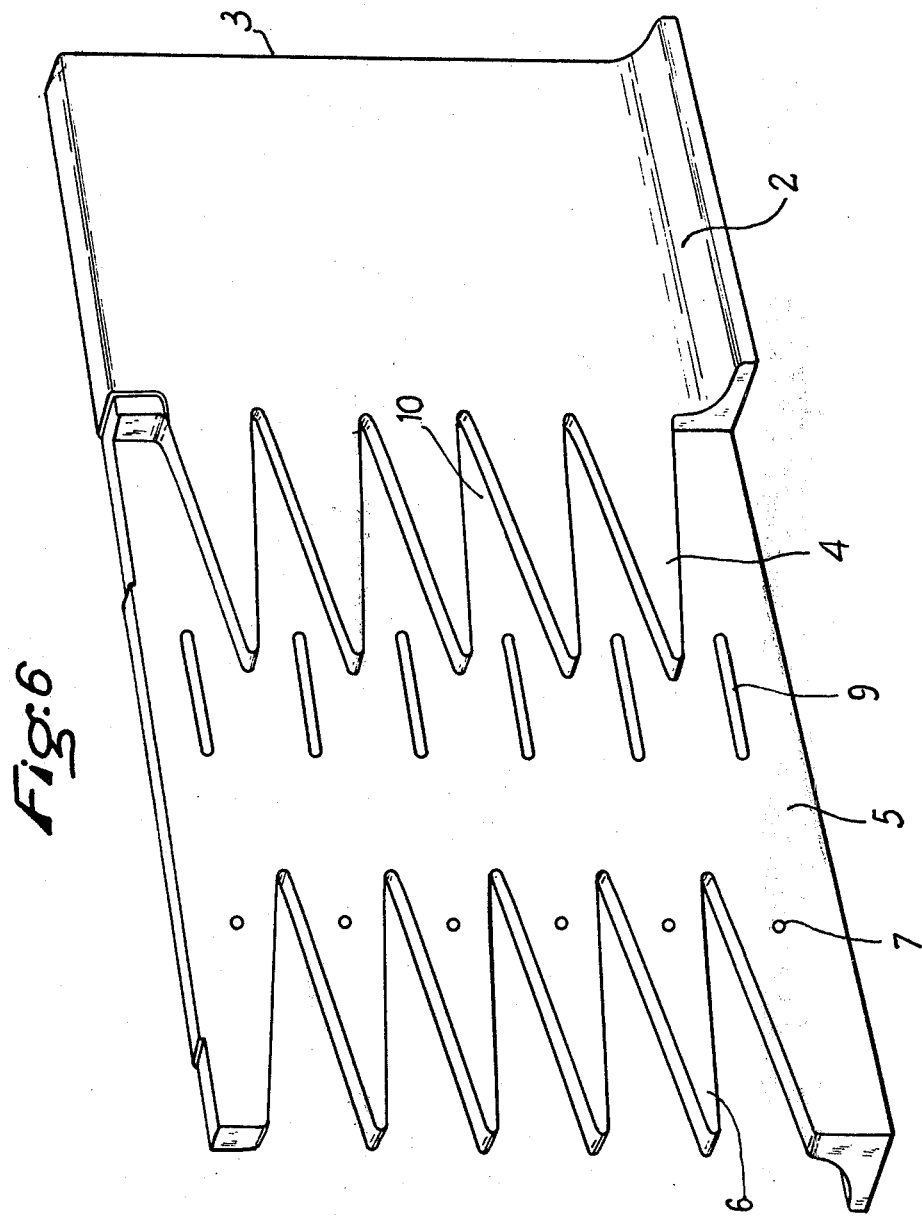

RAIL EXPANSION JOINT

FIELD OF THE INVENTION

The present invention relates to a rail expansion joint. The areas of possible application are the expansion joints of the armatures of linear motors, the expansion joints of current distributors and, in a general manner, all devices allowing the free play of thermal expansion effects.

BACKGROUND OF THE INVENTION

Besides the solution to be brought to the problem posed by the effects of thermal expansion, the junction of the bars forming the armature of linear motors must also respond to requirements peculiar to this type of motor, in view of the constancy of the clearance, electrical phenomena and mechanical stresses.

Other factors are involved and must be taken into account when the armature serves also as a support or bearing for guide or braking means of the device being propelled.

The problem thus posed implies, for the bars composing the armature and consequently their junctions, the following principal characteristics:

Continuity from the electrical standpoint (induced current lines);

Rigidity and mechanical strength (longitudinal or lateral reactions of traction, guidance, and braking, imposed by the relative movements of the armature and the inductor or of the vehicles propelled), Appropriate alignment of the active surfaces and absence of projections or protrusions which could influence the value of the clearance as well as the behavior of the guide means or mechanical braking, for example.

Moreover, the joint must have good reliability and must be easy to assemble and maintain.

The expansion joint which is the object of the present invention permits optimal satisfaction of all of these requirements.

SUMMARY OF THE INVENTION

This rail expansion joint is constituted in known fashion of two parts sliding over each other, each of which is attached to an end of two consecutive rails.

According to the present invention, these two parts of the expansion joint are identical and each includes a portion with a full cross-sectional thickness corresponding to that of the rail, by which it is attached to the end of the latter, for example by welding, and a half-cross-sectional thickness portion intended to overlap with the corresponding portion of the other part, the free ends of these two portions each terminating in a sawtooth profile meshing with the corresponding teeth of the two portions of the other part.

According to the invention, the two parts of the joint are slidably assembled by use of screws or bolts fixed in circular holes or slots formed in one of the parts and passing through oblong holes made in the other part. Preferably, the circular holes and the oblong slots are made in the half-cross-sectional thickness portion, respectively at the base of each tooth and opposite each space between the teeth of the full-cross-sectional thickness portion.

Sliders made of thin metal are provided, attached to one of the two overlapping parts, for example by welding, and covering the gap which exists between the free ends of the latter, on the upper edge and lower edge of the joint.

As an illustrative example, the invention will be described in terms of its application to a rail expansion joint which forms the armature of a linear motor.

BRIEF DESCRIPTION OF THE DRAWINGS

Other characteristics and advantages of the invention will be seen from the description below of a sample embodiment represented in the attached drawings in which:

FIG. 1 shows a perspective view of an expansion joint in accordance with the invention, FIG. 2 shows a side elevational view thereof, FIG. 3 is a cross-sectional view taken along line III—III in FIG. 2, FIG. 4 is a cross-sectional view taken along line IV—IV in FIG. 2.

FIG. 5 shows different examples of elements which are guided or braked on the armature, whose joint adapts easily, without significant disturbance to the vehicle in question, and FIG. 6 shows a perspective view of a half-element of the insulated joint.

The expansion joint as shown in side perspective in FIG. 1 is composed of two identical parts of plates 1 and 2, of which FIG. 6 shows one.

Each part 1 and 2 is made up of a portion 3 having a full cross-sectional thickness corresponding to that of the rail to which it is joined, preferably by welding, and a portion 5 which has a half-cross-sectional thickness. The portion 5 with a half-cross-sectional thickness is intended to overlap the corresponding portion of the other part. The free ends of these two portions 3 and 5 terminate in saw tooth shapes 4 and 6.

Each part 1 and 2 has in its free area both circular holes 7 intended for fixing elements such as bolts or screws 8, and oblong slots 9 corresponding to the anticipated path of expansion and in which the bolts or screws 8 can move.

During assembly, the two parts of the joints respectively designated by 1 and 2 are assembled head-to-tail. Merely by apposition, the saw teeth 6 of portion 5 are inserted in the gaps 10 between the teeth of corresponding teeth 4, in the portion 3 with complete thickness. In the course of this operation, the circular holes 7 of the one part and the oblong slots 9 of the other part coincide.

Parts 1 and 2 are then assembled by means of screws or bolts 8, which may be associated with lock washers and regular washers 11. These screws or bolts, held in the circular holes 7 of one part, allow the longitudinal displacement of the other part by their sliding in the oblong slots 9 of the latter, the joint thus constituted allowing a shift due to expansion of the distance L (FIG. 2).

Supports 12, 13, which may or may not be recessed, are fixed respectively to one of the two parts of the joint to overlap the other part thereby covering the space between the free ends, are intended to eliminate the air leakages in the vertical direction, in the case of guidance of the apparatus or air-cushion vehicles.

FIG. 5 clearly shows that in the case of guidance of vehicles with lateral wheels 14 (linear motor or others) the design of the joint described and represented eliminates all discontinuity or roughness at right angles to the surface on which these guide wheels roll.

In the case of guidance of an air-cushion vehicle, the unavoidable air losses vertical to expansion joints with considerable elongation are practically zero in this case in the vertical direction, due to the presence of supports 12, 13 and reduced to an absolute minimum in the longitudinal direction, the spaces or interruptions practically representing only a third of the height of the joint in each section considered separately.

The continuity of the surface is practically the same in the case of mechanical braking by brake shoes 16, which makes such braking compatible with the expansion joint described and represented.

The advantages provided by the invention follow from the description and the drawings. They consist primarily in:

the sturdiness of the joint design, the possibility of absorption of considerable expansion effects, thus allowing the use of rails of great length, the narrowness of the spaces on the faces of the joint, in the contraction position of the armature, the large size of the surfaces in contact between each half joint.

Of course, the invention is not strictly limited to the structural details of the expansion joint described and represented, whose shapes, cross-sections, and proportions may be divergent to a certain degree from the example described and represented without thereby departing from the scope of the invention.

What is claimed is:

1. In a rail expansion joint comprising a first part adjacent to and in sliding relationship to a second part, said first and second parts being identical to each other and being disposed in facing relationship such that the attitude of one is 180° with respect to the attitude of the other, each said part comprising a first portion having a full cross-sectional thickness corresponding to the thickness of said rail, and a second portion having a cross-sectional thickness substantially half that of said first portion so that the two half portions of said first and second parts are in side-by-side sliding relationship to provide a full width section, the improvement consisting in that:

each said portion of said first and second parts terminates in a sawtooth profile adapted to engage the complementary teeth of the two sawtooth portions of the other part, said second portion of each part extending completely beyond the complementary engaged sawtooth profiles of the first portion of the same part and the second portion of the other part, and extending to engage the first portion of the other part. and wherein the two second portions of said two parts are slidably assembled by means of screws or bolts inserted through circular holes made in one of said parts and passing through oblong parts made in the other said part, said circular holes and said slots being located, respectively, in said second portion at the base of each tooth of said second portion and opposite each gap between the teeth of said first portion.

2. Expansion joint according to claim 1 further including supports made of thin metal which are attached to one of the two overlapping portions thereby covering the space existing between the free ends of the latter, on the upper edge and the lower edge of the joint.

3. Rail expansion joint, composed of two parts sliding on each other, each being fixed to the end of two consecutive rails, characterized in that said two parts are substantially identical and each comprises a portion with a full cross-sectional thickness corresponding to that of the rail, by which it is fixed at its end to the latter and a portion with a half-cross-sectional thickness overlapping the corresponding portion of the other part, the free ends of these two portions each terminating in a sawtooth profile engaging the corresponding teeth of the two portions of the other part, said rail expansion joint being further composed of supports made of thin metal which are attached to one of the two overlapping portions thereby covering the space existing between the free ends of the latter, on the upper edge and the lower edge of the joint.

4. Rail expansion joint, composed of two parts sliding on each other, each being fixed to the end of two consecutive rails, characterized in that said two parts are substantially identical and each comprises a portion with a full crosssectional thickness corresponding to that of the rail, by which it is fixed at its end to the latter and a portion with a half-cross-sectional thickness overlapping the corresponding portion of the other part, the free ends of these two portions each terminating in a sawtooth profile engaging the corresponding teeth of the two portions of the other part, the two parts of the joint being slidably assembled by means of screws or bolts inserted in circular holes made in one of the parts and passing through oblong slots made in the other part, said circular holes and said slots being located in the half-cross-sectional portion, respectively at the base of each tooth and opposite each gap between the teeth in the full cross-sectional thickness portion.

* * * * *